United States Patent [19]
Giovando

[11] Patent Number: 5,310,826
[45] Date of Patent: May 10, 1994

[54] THIOLIC COMPOUND POLYMERIZATION COCATALYSTS

[75] Inventor: Gualtiero Giovando, Monforte d'Alba, Italy

[73] Assignees: Akzo N.V., Arnhem, Netherlands; Saint Peter S.r.l., Turin, Italy; a part interest

[21] Appl. No.: 768,266
[22] PCT Filed: Apr. 26, 1990
[86] PCT No.: PCT/EP90/00729
§ 371 Date: Oct. 21, 1991
§ 102(e) Date: Oct. 21, 1991
[87] PCT Pub. No.: WO90/12826
PCT Pub. Date: Nov. 1, 1990

[30] Foreign Application Priority Data

| Apr. 26, 1989 | [IT] | Italy | 67301A89 |
| Apr. 26, 1989 | [IT] | Italy | 67302A89 |
| Nov. 7, 1989 | [IT] | Italy | 67954A89 |
| Dec. 18, 1989 | [IT] | Italy | 68109A89 |

[51] Int. Cl.$^5$ .................................... C08F 20/00
[52] U.S. Cl. .................... 525/438; 525/22; 525/23; 525/384; 525/526; 525/531; 252/182.17; 252/182.19
[58] Field of Search ........... 252/182.17, 182.19; 525/22, 23, 438, 531, 384, 526

[56] References Cited

U.S. PATENT DOCUMENTS

| 3,214,490 | 10/1965 | Leebrick et al. | 260/863 |
| 3,291,776 | 12/1966 | Newey et al. | 260/47 |
| 3,318,974 | 5/1967 | Montesano | 525/40 |
| 3,553,283 | 1/1971 | Doss et al. | 525/533 |
| 3,626,031 | 12/1971 | Chambers et al. | 525/207 |
| 3,839,494 | 10/1974 | Hickner et al. | 525/483 |
| 4,092,293 | 5/1978 | Harris et al. | 528/93 |
| 4,120,875 | 10/1978 | Hirshman et al. | 260/346.11 |
| 4,153,586 | 5/1979 | Hockswender et al. | 525/533 |
| 4,177,173 | 12/1979 | Carr | 252/182.17 |
| 4,220,513 | 9/1980 | Green | 525/507 |
| 4,329,263 | 5/1982 | Buono et al. | 525/27 |
| 4,380,605 | 4/1983 | Gallagher et al. | 525/14 |
| 4,446,264 | 5/1984 | Cottman | 524/302 |
| 4,571,420 | 2/1986 | Marks | 525/350 |
| 4,663,072 | 5/1987 | Cheung | 252/182.19 |

FOREIGN PATENT DOCUMENTS

| 767644 | 5/1970 | Belgium . |
| 160621 | 11/1983 | European Pat. Off. . |
| 329093 | 8/1989 | European Pat. Off. . |
| 57040524 | 8/1980 | Japan . |
| 59-126430 | 1/1983 | Japan . |
| 62-257936 | 5/1986 | Japan . |
| 63-186727 | 1/1987 | Japan . |
| 64001721 | 6/1987 | Japan . |
| 62-212418 | 9/1987 | Japan . |
| 01174518 | 7/1989 | Japan . |
| 1294726 | 11/1989 | Japan . |
| 1170983 | 11/1969 | United Kingdom . |

*Primary Examiner*—John C. Bleutge
*Assistant Examiner*—Randy Gulakowski
*Attorney, Agent, or Firm*—Richard P. Fennelly; Louis A. Morris

[57] ABSTRACT

Accelerator compositions for the free radical polymerization of unsaturated polyesters and for the curing of unsaturated polyesters and polyurethanes are disclosed. More particularly, use is made of complexes of thiolic compounds with metal salts as the accelerators. In more preferred embodiments, the accelerators also include oxygen-containing compounds or phosphorus-containing compounds. Also disclosed are curable resin compositions comprising these accelerators and polymerization and curing processes employing these accelerators.

26 Claims, No Drawings

THIOLIC COMPOUND POLYMERIZATION COCATALYSTS

The present invention relates to thiol group-containing compositions useful as accelerators for the curing of unsaturated maleic, vinylic, allylic and epoxy-type polyester resins, epoxy resins and polyurethanes, as well as the polymerization of these materials. More particularly, the thiol group-containing materials are employed in the form of a complex with selected metal salts as accelerators for curing unsaturated polyester resins, epoxy resins and polyurethanes.

Thiol compounds are known for use in curing unsaturated polyesters. For example, in U.S. Pat. No. 3,318,974 it is disclosed to cure unsaturated polyesters with peroxides in the presence of thioglycolic acid accelerators.

Japanese patent application JA-7039468 discloses the curing of polyesters with a peroxytriazine in the presence of a mercaptan accelerator. As an example of the accelerator is given t-dodecylmercaptan. Japanese patent application J6-2257936 discloses the use of a polythiol compound such as pentaerythritol tetrathioglycolate for the curing of epoxy resins.

U.S. Pat. No. 3,291,716 describes the use of a wide variety of —SH group-containing compounds for the curing of epoxide resins. More particularly, polymercaptans having at least two —SH groups are disclosed including monomeric polymercaptans, polymeric-type polymercaptans, polythiopolymercaptans and even organic sulfides. U.S. Pat. No. 3,214,490 discloses the acceleration of the hydroperoxide initiated polymerization of ethylenically unsaturated materials with an organotin mercaptoester and, optionally, cobalt naphthenate in conjunction therewith.

European patent application 0 329 093 discloses the use of polythiols as epoxy resin curing agents. These polythiols are obtained by the reaction of a polyglycidyl amine with hydrogen sulfide and are said to be useful as curing agents in the absence of a tertiary amine.

Other thiol-containing materials disclosed in the prior art include the use of a poly-thiol such as glycerine tris(mercaptoacetate), glycerin tris(mercaptopropionate) and glycerine tris(mercaptobutylate), in the presence of an amine for the curing of epoxy resins which is described in Japanese patent application J6-3186727; thiol-diene adducts for epoxy resin curing described in U.S. Pat. No. 3,838,494; propoxylated ether polythiols for curing epoxy resins described in U.S. Pat. No. 4,092,293; and butyl thiostannic acid anhydride in combination with nadic methyl anhydride are known for epoxy curing from U.S. Pat. No. 4,120,875.

A combination of a 2-mercaptoalcohol and a cobalt or vanadium compound are known for use in the curing of unsaturated polyester compounds from British patent 1,170,983. Typically this curing is carried out in the presence of a peroxide and a copolymerizable monomer.

The hardening of polyesters with a vanadium compound and a polyol thioglycolate ester as accelerators is disclosed in Belgian patent 767,644. Again, the hardening is carried out in the presence of a copolymerizable monomer.

U.S. Pat. No. 4,380,605 discloses the use of mercaptobenzothiazole with an inorganic metal salt and a peroxyester initiators for the room temperature cross-linking of unsaturated polyester resin. The inorganic metal salt is selected from iron and copper salts and mixtures thereof.

Also known as epoxy resin hardeners are triphenyl phosphine and triphenyl phosphite which are disclosed in Japanese patent applications J6-4001721, J6-2212418 and J5-7040524. In addition, Japanese patent application J5-9126430 discloses the use of quaternary phosphonium salts in combination with mercaptobenzothiazole for the hardening of epoxy resin compositions.

European patent application 0 160 621 discloses the use of a combination of a polymercaptan and an organic phosphite for the hardening of an epoxy resin in the presence of a radically polymerizable compound and an organic peroxide. The mercaptan is preferably an ester of a mercaptocarboxylic acid with a 2 to 6 carbon polyol, a phenol or a novolac.

Finally, Japanese patent application JO-1174518 discloses the reaction of an epoxy resin and a carboxylic acid anhydride in the presence of triphenylphosphine in combination with lithium chloride as a catalyst, among other listed catalyst materials. This epoxy resin is employed as a binder for an electrostatic toner for developing electrocharged images.

In the field of curing accelerators/catalysts there exist very specialized requirements for each and every curing system. Thus, there remains a need for the development of new combinations of curing accelerators which exhibit specific advantageous properties and provide the ability to more completely control the parameters of the cure procedure. The present invention has for one of its objects to meet these demands.

SUMMARY

For the free-radical polymerization, in the presence of per-compounds, of unsaturated maleic and allylic polyesters, and in the polymerization of epoxy resins, use is made of thiolic compounds, and more preferably thiolic compounds carrying at least two SH-functions.

In a further aspect of the invention, for the curing of epoxy resins and unsaturated resins—polyurethanes, polyesters, maleics, allylics, vinylics—activated or inhibited thiols are employed. Lastly, phosphines and/or phosphites may be employed to further enhance the activity of the thiol accelerators.

DETAILED DESCRIPTION OF THE INVENTION

According to a first aspect, the invention has its subject the utilization of a metal chosen from the group constituted of lithium, manganese, aluminium, magnesium, zinc and tin, for the curing of a resin or prepolymer chosen from the group consisting of the unsaturated, maleic, vinylic, allylic and epoxy-type polyester resins, epoxy resins and polyurethanes in the presence of a thiolic compound.

The metal salt is able to form a complex with the thiolic compound. Consequently the scope of the invention includes a composition comprising a complex of a thiol, or its adduct, with a salt of a metal chosen from the above-mentioned group.

The complexes of the above-mentioned metals can be utilized as accelerators in combination with conventional initiators of peroxide type, in processes of curing of unsaturated polyesters, epoxy resins and polyurethanes, as well as for enhancing the free radical polymerization reaction of unsaturated polyester resins and epoxy resins. Such complexes can furthermore be employed along with known conventional accelerators and peroxidic initiators.

The salt employed for formation of the complex is preferably a halide, nitrate or acetate. Chlorides are especially preferred.

According to the invention, the thiols employed in the formation of the accelerators are preferably compounds carrying at least two —SH functions and having advantageously a molecular weight greater than 400. By way of examples, the following compounds can be advantageously employed:

dithiols such as: dipentene dimercaptan, ethylcyclohexyl dimercaptan, ethylene-1,2-bis-3-mercaptoacetate or propionate;

trithiols such as: 1,2,3-propanetrithiol, 1,2,6-hexanetrithiol;

tetrathiols such as: pentaerythritothiol, pentaerythritol tetramercaptoacetate or propionate; and polythiols such as thioesters of polyalcohols and sugars, and polythiol compounds of formula R—(—R—COH—CH$_2$—SH)$_n$ in which R is C$_3$-C$_{30}$ alkyl and n is an integer from 2 to 6.

Also suitable are adducts of di-, tri-, tetra- and polythiols with epoxides or anhydrides. By way of example, the adducts can be obtained by means of addition reactions between a polythiol and an anhydride chosen from among maleic, hexahydrophthalic, tetrahydrophthalic, methyltetrahydrophthalic, methylnadic (methyl endomethylenetetrahydrophthalic), succinic, dodecylsuccinic, pyromellitic, and chlorendic anhydrides.

Useful epoxide compounds for the preparation of an adduct with the thiol, include alkyl (C$_{3-18}$) diglycidyl ethers, polypropylenoxydiglycidyl ethers, polytetramethylenoxydiglycidyl ethers, butylglycidylether, 2-ethyleneglycidylether, alkylglycidylether, phenylglycidylether, o-cresylglycidylether, p-tertiary butylphenyl glycidylether, glyceroldiglycidyl ether, hexanedioldiglycidyl ether, glycyldiglycidyl ethers, neopentenediglycidyl ether, Bisphenol-A diglycidyl ether, Bisphenol-F diglycidyl ether, and cycloaliphatic epoxides such as vinylcyclohexenediepoxide and cycloaliphatic epoxides of formula I:

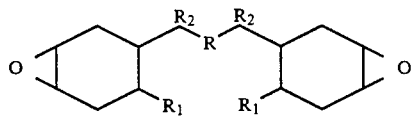

Formula I in which R is chosen among alkylene, oxygen, —O—R$_3$—O, —O—CO—R$_3$—CO—O; R$_3$ being alkylene; R$_1$ is hydrogen or methyl; R$_2$ is hydrogen or =O.

In the procedure for the curing of the abovementioned resins, which is a further subject of the invention, the metal complex compound acting as the a-accelerator is typically employed in such a way as to furnish an amount of metal, expressed as the corresponding chloride, which comprises between 20 and 400 ppm on the basis of the weight of the resin.

More specifically the preferred concentrations are as follows:

LiCl, from 20 to 100 ppm on the basis of the resin weight,

AlCl$_3$, from 20 to 150 ppm on the basis of the resin weight,

MgCl$_2$, from 40 to 250 ppm on the basis of the resin weight,

ZnCl$_2$, from 60 to 350 ppm on the basis of the resin weight, and

SnCl$_4$, from 70 to 400 ppm on the basis of the resin weight.

It has been established that lithium chloride is particularly active. Zinc chloride, although exhibiting in itself an accelerating effect, can advantageously be used to slow down the accelerating effect of lithium chloride when used in combination therewith. Hence the scope of the invention includes the use of a combination of one or more of the salts, preferably the chlorides, with the thiolic compounds.

In the procedure of curing, the accelerators that are the subject of the invention can be employed in the presence of conventional quantities of peroxidic initiators which comprise between 0.02 and 5 weight ? -. based on the resin. The accelerators permit the reduction, by a substantial extent, the quantity of the peroxides down to values of between 0.02 and 0.7 weight ? ,. ,if desired. Standard peroxide initiators known for use with these resins, may be employed. Thus the procedure of curing for obtaining a cross-linked polymer, comprises the addition, to the resin or prepolymer, of a peroxidic initiator and the accelerator. The accelerator can be made of a thiol of the above-specified type, being at least in part present in the form of a coordination compound with a salt, preferably a chloride, of the above-specified metals and, optionally, one or more conventional accelerators.

Another aspect of the invention is, therefore, a curable mixture comprising a resin or prepolymer chosen from among the group of unsaturated maleic, vinylic, allylic and epoxy-type polyester resins, epoxy resins and polyurethanes, possibly an ethylenically unsaturated reactive monomer, and an accelerator consisting at least in part of a complex as previously described. The ethylenically unsaturated reactive monomer may be selected from the group consisting of styrene derivatives such as α-methyl styrene, indene, divinyl benzene, stilbene, di benzal actone, propenyl benzene, isopropanyl benzene, triallyl cyanurate, triallyl isocyanurate and mixtures thereof.

The present invention also relates to processes for the curing, by means of radical or ionic-radical catalysis, of unsaturated, maleic, vinylic and allylic polyester resins, epoxy resins and polyurethanes and to the polymerization of unsaturated polyester resins and epoxy resins, and provides compounds that are useful as cocatalysts or accelerators in the process of polymerization.

A further object of the invention is, therefore, the use of thiolic compounds chosen from the group that consists of dipentene dimercaptan, ethylcyclohexyl dimercaptan, ethylene-1,2-bis-3-mercaptoacetate and -propionate, 1,2,3-propanetrithiol, 1,2,6-hexanetrithiol, pentaerythritothiol, pentaerythritol tetramercaptoacetate, and -propionate, thioesters of polyalcohols and sugars, and thiolic derivatives of formula:

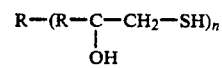

in which R is linear or branched alkyl I of 3 to 30 carbon atoms, while n is an integer from 2 to 6; and their adducts with mono-epoxides and anhydrides, in the polymerization of resins chosen from the group that consists of unsaturated, maleic, vinylic, allylic and epoxy-type polyesters and epoxy resins.

Tests have demonstrated that by using a cocatalyst selected from the abovementioned group, it is possible to obtain substantial advantages, in particular:

a low degree of liberation of styrene or other reactive solvents in the polymerization of unsaturated polyester resins;

a low degree of shrinkage;

the possibility for conducting the polymerization reaction while maintaining the resin at almost ambient temperature, generally between 25° and 40° C., which allows one to embed in the resin, thermosensitive and delicate items, especially electronic devices or objects of natural history;

a high yield of polymerization; and interesting qualities of the polymerized resin, which is generally transparent, colourless, resistant to ageing, and mechanically rugged.

A further advantage resides in the low levels of toxicity of these compounds.

The thiolic compounds can be employed in the process of crosslinking or curing of the resins not only in combination with conventional peroxidic initiators but also with other peroxides and per-compounds such as carbonates, persulphates, perborates and per-salts, and moreover with oxidants whether organic or inorganic, such as salts of metals of more than one oxidation state. Typically the thiolic compound is added to the resin in 0.1 to 2.0 weight % based on the resin when used with resins other than epoxy resins and from 15-150 weight percent based on the resin when employed to cure epoxy resins.

In the curing process of the present invention, one begins with the resin composition. To this there may optionally be added an ethylenically unsaturated reactive monomer. The accelerator composition may be added in several different manners. For example, the accelerator composition may be premixed to form the metal salt complex prior to it being added to the resin composition. Another possibility is to add the individual components of the accelerator composition to the resin and form the metal complex in situ. which of these methods is preferred will depend on the specific curing process being carried out.

Other additives, such as the peroxide initiator, or other accelerator enhancing materials may be added directly to the resin without first mixing them with the accelerator composition. However, in some cases it may be desirable to premix the accelerator enhancing materials with one or more of the accelerator components prior to introduction to the resin composition.

The temperature at which curing or polymerization is carried out can range from room temperature up to at least 250° C. The curing temperature wi 1 1 depend on the polyester being cured, the peroxide initiator and the particular curing accelerator that is employed.

The thiolic compounds of formula

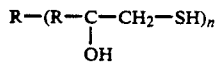

can be obtained by a reaction of the corresponding epoxy compound, of formula

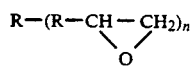

with thiols, thio compounds like urea or thiocyanates, hydrogen sulphide, and metal mercaptides.

The thiolic compounds may be advantageously employed in the form of adducts with anhydrides or epoxides. The choice of adduct allows one to improve the activity of the cocatalyst and to obtain compounds which are more compatible with the resin, especially with regard to solubility. Also, the thus obtained cocatalysts are better manageable and less toxic, smelly and volatile. Furthermore the resin polymerized in the presence of an adduct, has better properties in terms of transparency and better mechanical properties.

Examples of anhydrides suited to form an adduct, include maleic, hexahydrophthalic, methylhexahydrophthalic, tetrahydrophthalic, methyltetrahydrophthalic, methylendo(m)ethylenetetrahydrophthalic (methylnadic), succinic, dodecylsuccinic, pyromellitic and chlorendic. It is thought that the carboxyl group of the anhydride present in the adduct, plays an important part in the polymerization in the sense that it acts as an accelerator to the thiol, once it is bound to it.

As mono-epoxides, or monoglycidylethers, use is advantageously made of compounds selected from among $C_3-C_{18}$ alkyldiglycidyl ethers, polypropylenoxydiglycidyl ethers, polytetramethylenoxydiglycidyl ethers, glycerindiglycidyl ether, hexanediol glycidyl ether, glycoldiglycidyl pentene diglycidyl ether, Bisphenol-A diglycidyl ether, Bisphenol-F diglycidyl ether, butylglycidyl ether, diethyleneglycidyl ether, alkylglycidyl ether, phenylglycidyl ether, o-cresylglycidyl ether, p-tert.butyl phenyl glycidyl ether, and cycloaliphatic epoxides, more in particular compounds of formula:

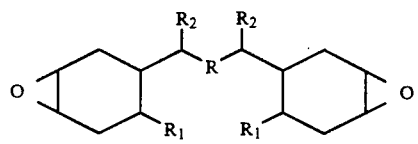

in which R is chosen from alklene, oxygen, —O—$R_3$—O—,

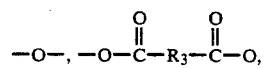

in which $R_3$ is alkylene; $R_1$ is hydrogen or methyl; $R_2$ is hydrogen or oxygen. A further example of a cycloaliphatic epoxide is vinylcyclohexenediepoxide. When making such adducts it is preferably to employ from 0.25-2.0 moles of anhydride or epoxide per —SH group. More preferably is 0.75-1.25 moles of anhydride or epoxide per —SH group.

The present invention refers in general terms to processes of curing, by means of radical or ionic-radical catalysis, of epoxy resins and of unsaturated resins: polyesters, polyurethanes, maleics, allylics, vinylics; and furnishes products and systems that are particularly effective for the curing of the said resins. A specific purpose of the present invention is the complete control of the parameters of the curing of such resins; such as: time of gelation, time of hardening, exothermal peak; and to amplify the types of cocatalyst utilizable in association with the thiol, or to enable the application of UV, X and Gamma radiations, or the application solely of thermal treatments.

Hence another object of the invention is the employment of thiols having within their molecule the following groups that activate the R—SH group; that is to say,

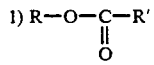

resulting in thiols "activated" inside their molecule, of structure:

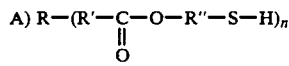

where n is an integer from 1 to 6, and R, R' and R" are organic radicals which do not significantly hinder the accelerative activity of the —SH group. More particularly, R, R' and R" are aliphatic, aromatic, cyclic hydrocarbons which may be substituted or unsubstituted. Preferably, at least one of R and R is an electron-repelling group.

Such products are obtained by esterification of an organic acid or polyacid with an alcohal substituted with an "SH" group (a nonexhaustive list of examples includes all di- or polybasic organic acids (examples include tartaric, malic, citric, oxalic, malonic, succinic, adipic, maleic, fumaric, benzenetricarboxylic acid, pyromellitic acid, formic acid)); a non-exhaustive list of thioalcohols includes 2-mercaptoethanol, 2-mercaptopropanol, 3-mercaptopropanol, mercaptotertiarybutanol, and mercaptomethanol.

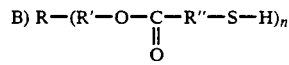

where n is an integer from 1 to 6, and R, R' and R" are as stated above. Such products are obtained by esterification of an alcohol, polyalcohol, saccharide or polysaccharide with an acid substituted with an "SH" group. A (non-exhaustive list of polyalcohols includes glycols, 1,2,3-propanetriol, 1,2,6-hexanetriol, pentaerythritol, erythritol, hexa-alcohols such as sorbitol, mannitol, and inositol, sugars such as glucose, fructose, and saccharose, polysaccharides (non-exhaustive list includes cellulose, starch, inulin, pentosans). Other alcohols include fatty alcohols, benzyl alcohol, 2-ethylhexylalcohol or methanol, ethanol, propanol and butanol.

Non-limitative examples of mercaptoacids are 2-mercaptoacetic acid, 2-mercaptopropionic acid, 3-mercaptopropionic acid, mercaptotertbutyric acids and mercaptoformic acid.

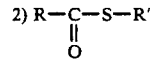

which result in intramolecularly "activated" thiols of structure:

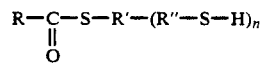

wherein n is an integer from 1 to 6 and R, R' and R" are as stated above, and which are obtained by opening-up of an aliphatic or cyclic organic anhydride. A non-exhaustive list of anhydrides includes succinic, dodecylsuccinic, maleic, hexahydrophthalic, methylhexahydrophthalic, tetrahydrophthalic, methyltetrahydrophthalic, methylendome-thylenetetrahydrophthalic (i.e. methylnadic), phthalic, chlorendic, pyromellitic; and a non-exhaustive list of thiols includes dipentenedimercaptan, ethylcyclohexyldimercaptan, all other dimercaptans, trimercaptans (e.g. 1,2,3-propanetrithiol, 1,2,6-hexanetrithiol), tetramercaptans (e.g. pentaerythritothiol), pentamercaptans, hexamercaptans (e.g. sorbitol, mannitol or sugars substituted with SH). 3) It is possible to effectively combine among them, the structures of sections 1)A) and B) on the one hand, with the structures of section 2) on the other hand, yielding by way of non-limitative examples:

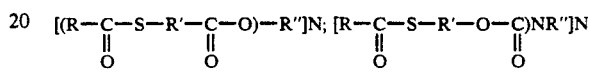

where n is an integer from 1 to 6, N is an integer from 1 to 10 and R, R' and R" are as stated above.

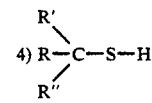

The tertiary mercaptans, especially if group R' and/or R" is an "electron repulsor" e.g. —CH$_3$, are capable of being activated even by "dibenzoylperoxide" in the cold; examples:

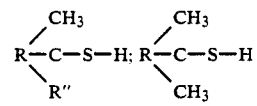

5) It is possible to effectively combine among them, the structures of sections 1 )A) , 1) B) and 2) on the one hand , with those of section 4) on the other hand, e.g.:

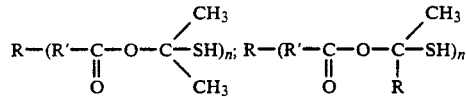

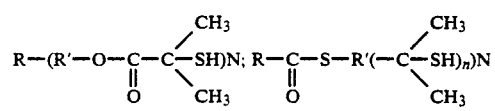

where n and N are integers from 1 to 6 and R, R' and R" are as stated above.

The following compounds are external activators of the thiol molecule, in the curing of the aforespecified resins:

1) all compounds that possess the following groups:

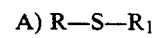

especially if the —S—S— group is close to "electron-repulsing" groups (e.g. ditertiarybutyl sulphide), wherein R and R$_1$ are organic radicals,

B) R—S—S—R$_1$ especially if the —S—S— group is close to "electron-repulsor" groups (e.g. ditertiarybutyl disulphide), wherein R and R$_1$ are organic radicals, and C) Some Cyclic Sulphides, as Also Sulpholane, Sulpholene, and Their Substitution Products These activators are employed in a quantity of 0.1–0.5% by weight, based on the weight of the resin.

2) Some compounds capable of existing in enol or keto form:

1) Vitamin C or ascorbic acid and its esters (e.g. ascorbyl acetate)

2) esters of acetoacetic acid including methyl acetoacetonate, ethyl acetoacetonate, vinyl acetoacetonate, and allylic acetoacetonate;

acetylacetone, benzoylacetone, dibenzoylmethane —diacetyl, glyoxal.

3) The following salts:
LiCl,
AlCl$_3$.6H$_2$O,
AlCl$_3$,
MgCl$_2$ and other salts of metals having a +3 or +4 oxidation state.

These materials are employed in quantities of 0.1 to 2 weight percent based on the weight of the resin.

Compounds are inhibitors of thiols during the curing of the afore-specified resins, include:

the following organic compound:
thiourea in an amount of 0.5 to 3.0 weight percent;
and the following salts:
ZnCl$_2$ in an amount of 0.01 to 0.1 weight percent;
and potassium salts—in particular K-ethylhexanoate in an amount of 0.1 to 3 weight percent; all weight percentages being based on the weight of the resin.

Tests, have shown that with polymerization cocatalysts chosen from the group of the afore-enumerated substances, it is possible to attain substantial advantages, in particular:
complete control of:
time of gelation
time of hardening
exothermal peak
stability of mixture of thiolic activator with resin to be cured;
the possibility of utilizing in the cold, as initiators for the curing of the aforementioned resins, almost all types of organic peroxides (including percarbonates and -dibenzoylperoxide), oxygenated water, per-salts, and many oxidant compounds and acids. Likewise, the possibility of employing, for the cold-curing of such resins, radiation in the UV, X or Gamma spectral region; and likewise the possibility of occasionally employing, for the curing of such resins, the thiolic products alone, at an elevated temperature between 40° and 100° C.

Further advantages include only a slight release of styrene or other reactive solvents in polymerization of unsaturated polyester resins; slight dimensional shrinkage; the possibility of conducting the polymerization reaction while keeping the resin at almost ambient temperature, generally comprised between 25° and 40° C., allowing to embed into the resin heat-sensitive and delicate -objects such as electronic devices or objects of natural history; a high yield of polymerization; and the ability to obtain interesting qualities of the thus obtained polymerized resin which is generally transparent, colourless, resistant to ageing, and endowed with a high mechanical stability. A further advantage is in the low levels of toxicity of these compounds.

The scope of this aspect of the invention includes a curable composition comprising a resin or a prepolymer chosen from the group that consists of epoxy resins and unsaturated resins—polyesters, polyurethanes, maleics, allylics and vinylics—, and a thiolic compound or its adduct. The scope of the invention furthermore includes a procedure for the curing of the above-cited resins, whether or not with the further addition of activators, or of retardants.

The thiolic compounds and their adducts can be marketed in the form of the separate additive destined to be added to the resin at the moment of cross-linking, or they can be preadded to the resin and marketed in the form of compositions of resin plus thiolic compound.

The invention also includes a curable composition comprising a resin or a prepolymer and a thiolic compound or its adduct. The scope of the invention also includes a procedure for the curing of the abovespecified resins comprising the addition, to the resin, of an accelerator or cocatalyst as specified above.

Also utilizable within the scope of the invention, are complexes constituted of a metal salt, a thiol or its adduct, and a second organic compound which is an oxygenated one. In this case, the salts of lithium, magnesium and manganese have proved particularly active.

Thus a further subject of the invention is the utilization of a salt of a metal selected from lithium, magnesium and manganese as the accelerator for the curing of a resin or prepolymer in the presence of a thiolic compound and an oxygenated organic compound carrying aldehyde, ketone, ether, ester or alcohol groups. In this case again, it is implied that the salt is able to form a complex with the thiol and the oxygenated compound. The preferred amount of oxygenated compound to be employed in the curing process is from 0.002–0.3% by weight, based on the weight of the resin. More preferably, the diethylene glycol is employed in the range of 0.01 to 0.2% by weight and, when using ascorbic palmitate, 0.02 to 0.1% by weight is used.

In particular, the following can be employed as the oxygenated compound:
keto- and aldo-esters and ethers or alcohols, in particular methylacetoacetate, ethylacetoacetate, mono- and diesters of ketoglutaric acid, pyruvates, sugars such as glucose and fructose; and esters of ascorbic acid such as ascorbic palmitate;
1,3-diketones and aldehydes, in particular acetyl-acetone, benzoylacetone, dibenzoylmethane;
mono- and diesters more in particular diethylmalonate and succinates;
1,2-diketones, in particular diacetyl and glyoxal
certain polyalcohols and other alcohols such as diethyleneglycol, benzyl alcohol and alcohols of the fatty series.

The thiols to be considered, are the same as those listed previously.

In a further aspect of the present invention, organic phosphites and phosphines are employed, optionally, in the presence of lithuim chloride, to enhance the accelerating effect of the thiol accelerators. The substantial advantages that result are the following:
the duration of the polymerization is considerably abbreviated,
the reaction conditions become much milder; e.g., the temperatures are much lowered, enabling operation even below ambient temperature with a sufficient speed of reaction,
an elevated yield of polymerization,
better resistance to ageing (radiation, heat),
a very good colour (absence of colour can also be realized), and
a contribution to the flame-retardant and heat-resistant properties.

Although mono- and diphosphites and -phosphines have an effect, the especially active and most preferred ones are the organic triphosphites and triphosphines, whether aliphatic, cycloaliphatic, heterocyclic, aromatic, or mixed. The type of substituent in the phosphite or phosphine influences the compatibility with the type of resin, and has a certain influence on the reactivity. More particularly, trisubstituted organic phosphites and phosphines are preferred. Among the most preferred materials are triphenylphosphine and triphenylphosphite.

The phosphine or phosphite is generally employed in an amount sufficient to enhance the activity of the thiol accelerator. More particularly, from 0.1-10.0 weight percent phosphine or phosphite is employed, and more preferably 0.2-4.0 weight percent, based on the weight of the resin. The use of the organic phosphites and phosphines is primarily for the curing of epoxy-type resins.

In addition, to avoid undesirable side reactions, it is often necessary to employ a small quantity of a lithium salt in combination with the phosphine or phosphite. For this purpose, lithium chloride is the most preferred material. Enough lithium chloride is employed to reduce the undesirable side reactions. More particularly, 0.02 to 1 weight percent of lithium is employed, based on the weight of the resin.

The organic phosphites and phosphines may themselves be further activated by the presence of an effective amount of sulphide materials to activate the organic phosphites and phosphines. If this is done then the curing step is carried out in the presence of a small amount of one or more of these sulphides. Such sulphide activators include ditertiary butyl sulphide, ditertiary butyl disulphide, sulpholane, sulpholene, substituted sulpholanes and substituted sulpholenes.

The invention is further illustrated by the following examples.

A) Tests Relating to the Application of Accelerators Consisting of Complexes of Thiols with Metal Salts

EXAMPLE 1

This test was performed using a thiolic compound obtained by means of a reaction of addition between pentaerythritoltetramercaptoacetate and maleic anhydride, the adduct having been obtained from the reagents by a reaction at 80° C. for 1 hour with fall-back.

To 100 g of a commercially available unsaturated polyester resin —DSM NX 170—were added 0.5 g of the thus obtained adduct and 0.2 g of a 10% ethanolic solution of aluminum chloride. To the mixture was added 2% by weight, of a peroxidic initiator in the form of 50% methyl ethyl ketone peroxide and 50% or acetylacetone peroxide.

The curing tests were carried out in a bath at 25° C. The crosslinking of the resin was followed with recording of the time of gelation (tg), the time for arriving at the exothermal peak (tpe), and the temperature of the exothermic peak (tpe). The yields of poly-merization were measured by means of DSC. The results pertaining to this test have been collected in Table I.

EXAMPLES 2-8

The test of example 1 was repeated with the same thiol adduct, unsaturated polyester resin and various peroxidic initiators, and using variously the chlorides of aluminium, lithium, magnesium and zinc, and varying the concentration of salt and the quantity of initiator. The results have been summarized in Table I. In all cases the polymerization yields achieved were in excess of 95%, attaining values close to 99%, as measured by means of DSC.

In particular with the use of the accelerators according to the invention, the obtained advantages reside in the rapidity of the cross-linking, in the high yield of cross-linking, and in the very low volatilization of the reactive solvent—styrene in this specific case. Moreover the possibility has been created for a reduction of the conventional amount of peroxidic initiator, whose application is generally undesirable from the point of view of workplace environment. Also, colourless and transparent resins are obtained.

EXAMPLES 9-14

A thiol complex, of lithium chloride with pentaerythritol-4-mercaptoacetate, was employed for the curing of an epoxy resin—Araldit Y 64631. The tests were carried out using 100 g of the resin and working in the cold, in a bath at 25° C. The tests were done using either the thiol complex alone, or in combination with curing agents for epoxy resins such as methylhexahydrophthalic anhydride, dimethylbenzylamine (DMBA) and isophorone diamine. Examples 11 and 12 are examples for comparison, effectuated in the absence of lithium chloride.

The employed amounts of curing agents, and the results concerning the time of polymerization and temperature of exothermal peak, are reported in Table II. Essentially analogous results were obtained employing aluminum chloride instead of lithium chloride.

B) Complexes of Thiol and Oxygenated Compound with Metal Salt

EXAMPLE 15

Preparation of Accelerator (Called Alpha-Accelerator in the Following)

The accelerator was prepared by dissolving 2 g of lithium chloride in 18 g diethyleneglycol, and adding 25 g of acetylacetone and 12 g of a thiol adduct obtained by the addition reaction between methylnadic anhydride and pentaerythritoltetramercaptopropionate, in a mixed solvent of 8 g dimethylsulphoxide and 10 g tetrahydrofuran. The thus obtained accelerator possesses a very low toxicity, and the polymerization tests relative to its application yielded colourless transparent polymerization products.

EXAMPLE 16

The accelerator obtained in example 15 was modified by the further addition of 2 g of manganese acetate. This accelerator, containing the manganese salt in addition to the lithium salt, presented an enhanced effect of gelation. Analogous accelerators can be obtained by using not the acetate but the lactate, chloride or ethyl -hexanoate of manganese (bivalent).

EXAMPLES 17-22

Effective accelerators were obtained according to the procedure of example 15 but using as the thiol a-ny one of the following:

adduct of maleic anhydride with pentaerythritoltetramercaptoacetate;

adduct of 1,2,3-propanetrithiol with propane diglycidyl ether;

adduct of pentaerythritol-tetramercaptoacetate with butane diglycidyl ether;

adduct of 1,2,3-propanetrithiol with glycerylglycidyl ether; and adduct of 1,2,3-propanetrithiol with Bisphenol-A glycidyl ether;

adduct of dipentenedimercaptan with butanediglycidylether and pentaerythritoltetramercaptoacetate.

EXAMPLES 23-29

The alpha-accelerator obtained according to example 15, and the accelerator obtained according to example 16, were employed in tests of polymerization of the commercially available polyester resins DSM 530, DSM 170 and Alusuisse 5026. Samples of 100 g size were taken and were processed in a thermostat bath of 25° C. The results of the polymerizations are reported in Table III. The polymerization tests have yielded satisfactory results even in the absence of conventional peroxidic initiators. The optimal quantities of peroxidic initiator proved to range from 0.02 to 0.2%. All obtained samples were colourless and transparent, and none liberated styrene during cross-linking. After the cross-linking they did not smell of styrene, and showed high mechanical resistances. The yield of the polymerization after 10 hours, with 2% of added peroxidic initiator, is about 95%, while it is about 85% when the extent of added peroxidic initiator equals 0.02%, in which latter case it can be raised to 98% by post-curing for 2-4 hours at 50°-80° C.

EXAMPLES 30-36

Polymerization tests were effectuated using the following thiolic compounds, obtained by reactions of addition between thiol and epoxide or anhydride at 80° C. for 1 hour with fall-back:

Compound 30: adduct of pentaerythritoltetramercaptopropionate and methylnadic anhydride;

Compound 31: adduct of -pentaerythritol tetramercaptoacetate and maleic anhydride;

Compound 32: adduct of 1,2,3-propanetrithiol and $C_3$-$C_{18}$-alkyldiglycidylether;

Compound 33: adduct of pentaerythritoltetramercaptoacetate and dipentenedimercaptan with $C_3$-$C_{18}$-alkyldiglycidylether;

Compound 34: adduct of 1,2,3-propanetrithiol and glyceringlycidylether;

Compound 35: adduct of 1,2,3-propanetrithiol and Bisphenol-A glycidyl ether, and Compound 36: adduct of 1,2,3-propanetrithio and pentaerythritolglycidylether.

The tests were carried out on 100-g samples of DSM NX 170 unsaturated polyester resin, in a 25° C. bath. A quantity of thiol adduct was employed equal to 0.5 weight % referred to the resin, and an amount of peroxide in the form of 75% methylethylketone peroxide in dibutylphthalate. In Table IV are reported the times of gelation, the time corresponding to the exothermic peak, and the temperature at the exothermic peak.

In all cases the yields of cross-linking as measured by DSC, were between 75 and 85% after 6 hours. The yields can be further enhanced to values comprised between 90 and 95%, by post-curing at 50°-80° C. for 2-4 hours. The thus obtained samples were generally quite colourless and transparent.

EXAMPLES 37-45

Polymerization tests have been carried out with the following thiolic compounds:
37 di-1,2-propanedithiolmaleate,
37a pentaerythritoltetramercaptoacetate,
38 ethylene-1,2-bis-3-mercaptopropionate,
39 ethylene-1,2-bismercaptotertiarybutyrate,
40 serbityltetramercaptoacetate,
41 an adduct realized by boiling at 80° C. for one hour, under "fall-back" [reflux], pentaerythritoltetra-mercaptoacetate plus methylhexahydrophthalic anhydride, in 1:2 molar ratio.
42 trimetcaptomethyl citrate,
43 trimercaptoethyl citrate,
44 trimercapto-2-propyl citrate, and
45 tetramercaptopyromellitate.

The tests with 37, 38, 39 and 40 were effectuated using 100 g of Alusuisse 5119 unsaturated polyester resin, in a 25° C. thermostat bath. Test 41 was effectuated using 100 g of epoxy resin of the type as obtained from Bisphenol A+epichlorohydrin, of c. 970 molecular weight, together with 2% of dimethyl benzyl amine. In Table V are listed the times of gelation, the time corresponding to the exothermal peak, and the temperature in the exothermal peak.

In all cases the yields of cross-linking, measured by DSC, proved to be comprised between 75% and 85% after 6 hours. Such yields may be further raised to values ranging from 90 to 95%, by post-curing for 2-4 hours at 50°-80° C. The obtained samples were generally quite colourless and transparent.

EXAMPLES 46-51

In the Table VI there are summarized a number of examples—which are non-limitative—in which 100 parts of epoxy resin, of the type obtained from Bisphenol A and epichlorohydrin and of approx. 970 molecular weight, are reacted (at 25° ambient temperature) with triphenyl-phosphine (selected from the phosphines by way of non-limitative example) or with triphenyl-phosphite (selected from the phosphites by way of non-limitative example) in the presence of a mercaptan (by way of non-limitative example pentaerythritylmercaptoacetate was chosen) and lithium chloride (in examples 48 and 49). Along with these examples, blank tests are presented for comparison: without lithium chloride (example 51), without mercaptan (example 47), without phosphorus compound (example 46).

From the examples, the accelerating effect from the trisubstituted phosphorus compounds is evident, especially in combination with mercaptan and lithium chloride. The products obtained by the polymerization have excellent mechanical and electrical characteristics, and have very bright colours.

TABLE I

| | Metal salt | Quantity of salt (weight %) | Quantity of peroxide (weight %) | Tg (min) | Tpe (min) | Tpe (°C.) |
|---|---|---|---|---|---|---|
| Ex. 1 | $AlCl_3$ 10% in ethanol | 0,2 | 2 | 3 | 5 | 126 |
| Ex. 2 | $AlCl_3$ 1% in ethanol | 0,2 | 2 | 1 | 6 | 98 |
| Ex. 3 | LiCl 10% in diethyleneglycol | 0,2 | 2 | 1 | 3 | 117 |
| Ex. 4 | LiCl 1% in diethyleneglycol | 0,2 | 2 | 1 | 9 | 81 |
| Ex. 5 | $MgCl_2$ 10% in diethyleneglycol | 0,2 | 2 | 2 | 5 | 98 |
| Ex. 6 | LiCl 1% in diethyleneglycol | 0,2 | 0,02 | 3 | 5 | 117 |
| Ex. 7 | $AlCl_3$ 1% in ethanol | 0,2 | 0,02 | 4 | 8 | 102 |
| Ex. 8 | $ZnCl_2$ 10% and LiCl 1% in diethyleneglycol | 0,1 0,2 | 2 | 30 | 25 | 95 |

TABLE II

| | Epoxide resin ARALDIT Y 64 631 100 g | | | | | |
|---|---|---|---|---|---|---|
| Curing agent | Ex. 9 | Ex. 10 | Ex. 11 | Ex. 12 | Ex. 13 | Ex. 14 |
| | Quantity of curing agent | | | | | |
| Pentaerythritol-tetramercaptoacetate (g) | 20 | 20 | 20 | 20 | 30 | 20 |
| LiCl (ppm) | 50 | 30 | — | — | 70 | 50 |
| Methylhexahydrophthalic anhydride (g) | 40 | — | 40 | — | — | — |
| DMBA (g) | — | — | — | — | — | 7 |
| Isophorone diamine (g) | — | 15 | — | 15 | — | — |
| Polymerization time | 24 h | 17' | 7 days | 55' | 81' | 15' |
| Temperature | 38° C. | 172° C. | 25° C. | 147° C. | 123° C. | 86° C. |

DMBA = dimethylbenzylamine

TABLE III

| | Example | | | | | | |
|---|---|---|---|---|---|---|---|
| | 23 | 24 | 25 | 26 | 27 | 28 | 29 |
| | Polyester resin DSM 530 | | | Polyester resin DSM 170 | | Polyester resin ALu Suisse 5026 | |
| Peroxides* weight % to resin | 0,02% | 0,02% | 0,2% | — | 0,02% | — | — |
| Other per-compounds, weight % to resin | — | — | — | Sodium perborate 0.3%-5% | — | — | Percarbonate 0.2%-25% |
| Time of final gelation | 11' | 13' | 6' | 16' | 8' | 25' | 15' |
| Temperature at exothermal peak (°C.) | 55° | 56° | 97° | 58° | 57° | 37° | 40° |
| Catalyst Example 15 | 1,5% | +++ | 1,5% | 1,5% | — | — | 1,5% |
| Catalyst Example 16 | — | 1,5% | — | — | 1,5% | 1,5% | — |

*Peroxides: methylethylketone peroxide or acetylacetone peroxide

TABLE IV

| | Non-limitative examples of dosage and cross-linking behaviour of thiols and their adducts | | | | | |
|---|---|---|---|---|---|---|
| Type of Thiol (Example No.) | Quantity of thiol in weight % to resin | Quantity of peroxide % based on weight of resin | Time of gelation | Time for arriving at exothermal peak | Temperature in exothermal peak | Note |
| 30 | 0,5% | 1-2% | 6' | 5' | 53° | Quite colourless and transparent |
| 31 | 0,5% | 1-2% | 8' | 8' | 62° | Quite colourless and transparent |
| 32 | 0,5% | 1-2% | 9' | 8' | 56° | Quite colourless and transparent |
| 33 | 0,5% | 1-2% | 12' | 10' | 57° | Quite colourless and transparent |
| 34 | 0,5% | 1-2% | 15' | 12' | 55° | Quite colour- |

TABLE IV-continued

Non-limitative examples of dosage and cross-linking behaviour of thiols and their adducts

| Type of Thiol (Example No.) | Quantity of thiol in weight % to resin | Quantity of peroxide % based on weight of resin | Time of gelation | Time for arriving at exothermal peak | Temperature in exothermal peak | Note |
|---|---|---|---|---|---|---|
| 35 | 0,5% | 1-2% | 10' | 9' | 61° | Quite colourless and transparent |
| 36 | 0,5% | 1-2% | 12' | 10' | 53° | Quite colourless and transparent |

TABLE V

| Type of Thiol | Quantity of thiol, weight % to resin | Type of peroxide, and weight % to resin | LiCl | ZnCl$_2$ | K-ethyl-hexanoate | Time of gelation | Time from gelation to peak | Temperature at peak | Note |
|---|---|---|---|---|---|---|---|---|---|
| 37 | 0,5% | Mekp 50%–0,2% | 0,002% | — | — | 4' | 4' | 148° | colourless and transparent |
| 37 | 0,5% | Dibenzoylperoxide 0,4% | 0,004% | — | — | 7' | 6' | 145° | colourless and transparent |
| 37A | 0,5% | Mekp 50%–0,2% | 0,002% | — | — | 3' | 3' | 150° | colourless and transparent |
| 37A | 0,5% | Mekp 50%–0,2% | 0,002% | 0,02% | — | 20' | 18' | 130° | colourless and transparent |
| 37A | 0,5% | Mekp 50%–0,2% | 0,002% | — | 0,1% | 60' | 58' | 102° | colourless and transparent |
| 37A | 0,5% | Mekp 50–0,2% | — | — | — | 15' | 14' | 70° | colourless and transparent |
| 37A | 0,5% | percarbonate 25%–0,4% | 0,002 | — | — | 7' | 5' | 145° | colourless and transparent |
| 37A | 0,5% | H$_2$O$_2$ 20%–0,3% | 0,002 | — | — | 3' | 3' | 152° | colourless and transparent |
| 38 | 0,5% | Mekp 50%–0,2% | 0,002 | — | — | 5' | 4' | 145° | colourless and transparent |
| 39 | 0,5% | Dibenzoyl peroxide 0,4% | 0,002 | — | — | 7' | 6' | 150° | colourless and transparent |
| 40 | 0,5% | Mekp 50%–0,2% | 0,002 | — | — | 3' | 3' | 150° | colourless and transparent |
| 41 | 100% | — | 0,002 | — | — | — | — | — | Time of hardening: 5 days at 25° C., 1 hour at 80° C. |

TABLE VI

| Example | Phosphorous compound | Amount of phosphorous compound | Mercaptan | Amount of mercaptan | Amount of lithium chloride | Duration of curing at 25° ambient temperature |
|---|---|---|---|---|---|---|
| 46 | — | — | Pentaerythritoltetramercaptoacetate | 50% | — | 5 days |
| 47 | Triphenylphosphine | 1% | — | — | — | 2 days |
| 48 | Triphenylphosphine | 1% | Pentaerythritoltetramercaptoacetate | 50% | 0,1% | 3 hrs. |
| 49 | Triphenylphosphite | 1% | — | — | — | 3 days |
| 50 | Triphenylphosphite | 1% | Pentaerythritoltetramercaptoacetate | 50% | 0,1% | 4 hrs. |
| 51 | Triphenlyphosphite | 1% | Pentaerythritoltetramercaptoacetate | 50% | — | 7 hrs. |

Note: The percentual amounts are weights added to 100 weight parts of the epoxy resin (which was obtained from Bisphenol-A and epichlorohydrin and had about 970 molecular weight).

What is claimed is:

1. An accelerator composition for the curing or polymerization of resins selected from the group consisting of unsaturated maleic, allylic, vinylic, and polyester resins, epoxy resins and polyurethanes, said composition comprising a complex of a salt of a metal selected from the group consisting of lithium, aluminum, magnesium manganese, zinc and tin, and a compound selected from the group consisting of thiols, which are selected from the group consisting of dipentene-dimercaptan; ethylcyclohexyldimercaptan; ethylene-1,2-bis-3-mercaptoacetate; ethylene-1,2-bis-3-mercaptopropionate; 1,2,3-propanetrithiol; 1,2,6-hexanetrithiol; pentaerythritolthiol; pentaerythritoltetramercaptoacetate; pentaerythritoltetramercaptopropionate; thioesters of polyalcohols, thioesters of sugars, thiolic derivatives of the formula:

$$R-(R-\underset{\underset{OH}{|}}{C}-CH_2-SH)_n$$

wherein R is a linear alkyl group having 3-30 carbon atoms and n is an integer of 2-6, and adducts of these thiols with epoxides and anhydrides.

2. A composition as claimed in claim 1 wherein said thiol has a molecular weight in excess of 400 and includes at least two —SH groups in each molecule.

3. A composition in accordance with claim 1 wherein said thiol compound contains at least one of the following functional groups therein:

$$R-O-\underset{\underset{O}{\|}}{C}-R' \quad ; \quad R-\underset{\underset{O}{\|}}{C}-S-R' \quad ; \quad R-\underset{\underset{R''}{|}}{\overset{R'}{C}}-S-H$$

wherein R, R' and R" are hydrogen or organic radicals and at least one of R' and R" is an electron-repelling group.

4. A composition in accordance with claim 3 wherein said thiol compound comprises a thiol compound of the formula:

$$R-(R'-\underset{\underset{O}{\|}}{C}-O-R''-SH)_n \text{ or } R-(R'-O-\underset{\underset{O}{\|}}{C}-R''-SH)_n$$

wherein n is an integer from 1-6, R is hydrogen or an organic radical, R' and R" are a covalent bond or an organic radical and at least one of R' and R" is an electron-repelling group, said thiol compound being obtained by the esterification of an organic acid or polyacid with an alcohol substituted with an —SH group, or by the esterification of an alcohol, polyalcohol, saccharide or polysaccharide with an organic acid substituted with an —SH group.

5. A composition as claimed in claim 4 wherein said organic acid or polyacid is selected from the group consisting of tartaric, malic, citric, oxalic, malonic, succinic, adipic, maleic, fumaric and benzenetricarboxylic isomers.

6. A composition in accordance with claim 3 wherein said thiol compound comprises a thiol compound of the formula:

$$R-(R'-\underset{\underset{O}{\|}}{C}-S-R''-SH)_n \text{ or } R-(R'-S-\underset{\underset{O}{\|}}{C}-R''-SH)_n$$

wherein n is an integer from 1 to 6, R is hydrogen or an organic radical, R' and R" are a covalent bond or an organic radical and at least one of R' and R" is an electron-repelling group, said thiol compound being obtained by the opening of an organic anhydride with formation of an adduct, or by esterification of an acid or polyacid selected from the group consisting of tartaric, malic, citric, oxalic, malonic, succinic, adipic, maleic, fumaric, and benzenetricarboxylic isomers with a thiol or polythiol.

7. A composition as claimed in claim 6 wherein said electron-repelling group is a methyl group.

8. A composition as claimed in any one of claims 1, 2 and 7 wherein said adduct with anhydride is formed with an anhydride selected from the group consisting of maleic, hexahydrophthalic, methylhexahydrophthalic, tetrahydrophthalic, methyltetrahydrophthalic, methylnadic, succinic, dodecylsuccinic, pyromellitic and chlorendic anhydrides.

9. A composition as claimed in any one of claims 1, 2 and 7 wherein said adduct with epoxide is formed with an epoxide selected from the group consisting of alkyl ($C_3-C_{18}$) diglycidyl ethers, polypropylenoxy diglycidyl ether, polytetramethylenoxy diglycidyl ether, glycerindiglycidyl ether, hexanediolglycidyl ether, glycolglycidylethers, neopentene diglycidyl ether, bisphenol-A diglycidyl ether, bisphenol-F diglycidyl ether and cycloaliphatic epoxides.

10. A composition as claimed in claim 9 wherein said cycloaliphatic epoxides are selected from the group consisting of vinylcyclohexenediepoxide and epoxides of the formula:

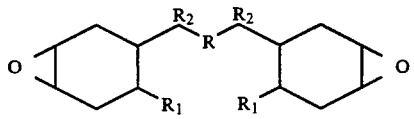

Formula I wherein R is an alkylene, oxygen, $-O-R_3-O-$, $-O-CO-R_3-CO-O-$, $R_3$ being alkylene; $R_1$ is hydrogen or methyl; and $R_2$ is hydrogen or $=O$.

11. An accelerator composition as claimed in any of claims 1-8 wherein said thiol compound is selected from thiol adducts with anhydrides selected from the group consisting of maleic, hexahydrophthalic, methylhexahydrophthalic, tetrahydrophthalic, methyltetrahydrophthalic, methylendomethylentetrahydrophthalic, methylnadic, succinic, dodecylsuccinic, pyromellitic and chlorendic anhydrides and thiol adducts with epoxides selected from the group consisting of alkyl ($C_3-C_{18}$) diglycidyl ethers, polypropylenoxydiglycidyl ether, polytetramethylenoxydiglycidyl ether, glycerindiglycidyl ether, hexanediolglycidyl ether, glycolglycidyl ethers, neopentane diglycidyl ether, bisphenol-A diglycidyl ether, bisphenol-F diglycidyl ether and cycloaliphatic epoxides.

12. An accelerator composition as claimed in any one of claims 1, 2, 3, 7 and 10 which further comprises a sufficient amount of an oxygenated organic compound which includes at least one functional group selected from the group consisting of aldehyde, ketone, ether, ester, or alcohol to enhance the accelerative effect of said —SH group-containing accelerator composition.

13. An accelerator composition in accordance with claim 12 wherein said metal is selected from the group consisting of lithium, manganese, vanadium, and magnesium.

14. A composition in accordance with claim 13 wherein said oxygenated compound is selected from the group consisting of keto- and aldoesters, ethers or alcohol, 1,3-diketones, and dialdehydes, 1,2-diketones, mono- and diesters and polyalcohols.

15. A composition in accordance with claim 13 wherein said oxygenated compound is selected from the group consisting of ethylacetoacetate, mono- and diesters of ketoglutaric acid, esters of pyruvic acid, glucose, fructose, acetylacetone, benzoylacetone dibenzoylmethane, diethylmalonate, succinates, diacetyl, glyoxal, diethyleneglycol, benzylglycol and ascorbic palmitate.

16. A composition as claimed in any one of claims 1, 2, 3, 7 and 10 which further comprises an effective amount of at least one compound selected from the group consisting of organic phosphites and organic phosphines to enhance the accelerative effect of said —SH group-containing composition.

17. A composition as claimed in claim 16 wherein said phosphine or phosphine is trisubstituted with substituents selected from the group consisting of aliphatic, cycloaliphatic, heterocyclic or aromatic radicals.

18. A composition as claimed in claim 17 wherein said metal salt is lithium chloride.

19. A composition as claimed in any one of claims 1, 2, 3, 7 and 10 further comprising a sufficient amount of at least one activator selected from the group consisting of ditertiary butyl sulphide, ditertiary butyl disulphide, sulpholane, sulpholene, substituted sulpholanes, substituted sulpholenes, to enhance the accelerative activity of said —SH group-containing composition.

20. A composition as claimed in any one of claims 1, 2, 3, 7 and 10 further comprising an effective amount of at least one retarder selected from the group consisting of zinc chloride, potassium-2-ethylhexanoate and thiourea, to retard the accelerative activity of said —SH group-containing composition.

21. A process for the curing of a resin selected from the group consisting of unsaturated maleic, allylic, vinylic and polyester resins, epoxy resins and polyurethanes, said process comprising the step of curing said resin in the presence of a curing agent composition comprising a curing agent, an effective amount of at least one composition as claimed in claim 30 to accelerate said curing and 0–50 weight percent of at least one ethylenically unsaturated reactive monomer.

22. A process as claimed in claim 21 wherein said composition is present in an amount corresponding to a metal chloride content of from 200 to 400 ppm on the basis of the weight of said resin.

23. A process as claimed in claim 22 wherein said ethylenically unsaturated monomer is selected from the group consisting of styrene and styrene derivatives such as α-methylstyrene, indene, divinyl benzene, stilbene, dibenzalacetone, propenyl benzene and isopropenyl benzene; triallyl cyanurate, triallyl isocyanurate and mixtures thereof.

24. A process as claimed in any one of claims 1, 22 or 23 wherein said curing agent composition further comprises from 0.02 to 5.0 weight percent of a peroxide initiator based on the weight of said resin.

25. A curable composition which comprises a resin or prepolymer selected from the group consisting of unsaturated maleic, allylic, vinylic and epoxy-type polyesters, epoxy resins and polyurethanes, 0–50 weight percent of an ethylenically unsaturated reactive monomer, 0.02–5.0 weight percent of a peroxide initiator and an effective amount of a composition as claimed in claim 1 to accelerate the curing of said curable composition, all weight percentages being based on the weight of said resin.

26. A composition as claimed in any one of claims 1–7 further comprising an effective amount of at least one compound selected from the group consisting of organic phosphites and organic phosphines to enhance the accelerative effect of said —SH group-containing composition and an activator selected from the group consisting of sulphides to activate said phosphine or phosphite.

* * * * *